(12) United States Patent
Yang

(10) Patent No.: US 9,972,248 B2
(45) Date of Patent: May 15, 2018

(54) PIXEL STRUCTURE AND DRIVING METHOD THEREOF, AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 14/778,848

(22) PCT Filed: Oct. 11, 2014

(86) PCT No.: PCT/CN2014/088396
§ 371 (c)(1),
(2) Date: Sep. 21, 2015

(87) PCT Pub. No.: WO2016/004690
PCT Pub. Date: Jan. 14, 2016

(65) Prior Publication Data
US 2016/0155385 A1 Jun. 2, 2016

(30) Foreign Application Priority Data
Jul. 7, 2014 (CN) .......................... 2014 1 0321351

(51) Int. Cl.
*G09G 3/3258* (2016.01)
*G06F 3/0354* (2013.01)
(Continued)

(52) U.S. Cl.
CPC ....... *G09G 3/3258* (2013.01); *G06F 3/03545* (2013.01); *G06F 3/03548* (2013.01);
(Continued)

(58) Field of Classification Search
None
See application file for complete search history.

(56) References Cited

U.S. PATENT DOCUMENTS

2006/0103324 A1 5/2006 Kim et al.
2010/0127960 A1 5/2010 Jung et al.
(Continued)

FOREIGN PATENT DOCUMENTS

CN 1567416 A 1/2005
CN 101751887 A 6/2010
(Continued)

OTHER PUBLICATIONS

International Search Report and Written Opinion dated Apr. 16, 2015; PCT/CN2014/088396.
(Continued)

*Primary Examiner* — Kenneth B Lee, Jr.
(74) *Attorney, Agent, or Firm* — Ladas & Parry LLP

(57) ABSTRACT

Provided are a pixel structure and driving method thereof, and a display apparatus. The pixel structure comprises a plurality of pixel units and compensation units corresponding to the pixel units. Each of the pixel units comprises two adjacent pixel circuits which are a first pixel circuit and a second pixel circuit. The first pixel circuit comprises a first driving transistor (DTFT1) and a first display device (OLED1), and the second pixel circuit comprises a second driving transistor (DTFT2) and a second display device (OLED2), wherein the first pixel circuit and the second pixel circuit share the compensation unit and are controlled by a same data line (Data). The compensation unit is configured
(Continued)

to adjust a gate voltage of the first driving transistor (DTFT1) in the first pixel circuit to eliminate the influence of the threshold voltage of the first driving transistor (DTFT1) on the driving current of the first display device (OLED1), and to adjust a gate voltage of the second driving transistor (DTFT2) in the second pixel circuit to eliminate the influence of the threshold voltage of the second driving transistor (DTFT2) on the driving current of the second display device (OLED2). The pixel structure can reduce the pixel size and obtain higher resolution.

18 Claims, 4 Drawing Sheets

(51) Int. Cl.
    *G06F 3/044*     (2006.01)
    *G09G 3/3233*     (2016.01)
    *G06F 3/042*     (2006.01)

(52) U.S. Cl.
    CPC .............. *G06F 3/042* (2013.01); *G06F 3/044* (2013.01); *G09G 3/3233* (2013.01); *G09G 2300/0465* (2013.01); *G09G 2300/0819* (2013.01); *G09G 2300/0842* (2013.01); *G09G 2300/0861* (2013.01); *G09G 2320/043* (2013.01); *G09G 2320/045* (2013.01)

(56) References Cited

U.S. PATENT DOCUMENTS

| | | |
|---|---|---|
| 2011/0221789 A1 | 9/2011 | Ota |
| 2012/0026146 A1 | 2/2012 | Kim |
| 2013/0120342 A1 | 5/2013 | Wang et al. |
| 2014/0176402 A1 | 6/2014 | Lee et al. |

FOREIGN PATENT DOCUMENTS

| | | |
|---|---|---|
| CN | 101826300 A | 9/2010 |
| CN | 102194407 A | 9/2011 |
| CN | 103150991 A | 6/2013 |
| CN | 103268753 A | 8/2013 |
| CN | 203480810 U | 3/2014 |
| CN | 104078004 A | 10/2014 |
| CN | 104091559 A | 10/2014 |

OTHER PUBLICATIONS

First Chinese Office Action dated Nov. 23, 2015; Appln. No. 201410321351.2.
International Search Report and Written Opinion both dated Apr. 16, 2015; PCT/CN2014/088396.
Second Chinese Office Action dated Jul. 5, 2016; Appln. No. 201410321351.2.
Extended European Search Report dated Feb. 9, 2018; Appln. No. 14882770.2.

PIXEL STRUCTURE AND DRIVING METHOD THEREOF, AND DISPLAY APPARATUS

TECHNICAL FIELD OF THE DISCLOSURE

The present disclosure relates to a pixel structure and driving method thereof, and a display apparatus.

BACKGROUND

OLED (Organic Light-Emitting Diode) as a current type light emitting device has been more and more applied to high performance display. Conventional passive matrix OLEDs need shorter driving time for a single pixel with the increase of display size, and thus require increased instantaneous current; therefore power consumption is increased. At the same time, the application of large current causes too large voltage drop in the ITO (Indium Tin Oxide) line, and causes too large operating voltage of the OLED, reducing its efficiency. On the contrary, the AMOLED (Active Matrix OLED) can solve those problems well by scanning current inputted into OLED line by line via switch transistors.

In backboard design of AMOLED, the main problem needing to be solved is the brightness nonuniformity between pixels.

First, AMOLED uses TFTs (Thin Film Transistors) to construct a pixel circuit to provide corresponding current for the OLED, wherein low temperature polycrystal silicon TFTs (LTPS TFTs) or oxide TFTs are mostly used. Compared with a general amorphous silicon TFT (amorphous-Si TFT), the LTPS TFT and the oxide TFT have larger mobility and more stable characteristics, and are more suitable for be applied to AMOLED display. However, due to the limitation of crystallization process, the LTPS TFTs fabricated on a large glass substrate usually have nonuniformity on electrical parameters such as threshold voltage, mobility and so on. Such nonuniformity will be converted to current difference and brightness difference of the OLED display devices which can be perceived by human eyes, i.e., a mura phenomenon. Although the Oxide TFT has good uniformity in terms of process, similar to the a-Si TFT, its threshold voltage will drift when voltage and high temperature are applied for a long time. TFTs in different parts of the panel have different drift amount due to different display pictures, which would cause display brightness difference. Because this difference is related to the picture displayed previously, it is usually presented as an afterimage phenomenon.

Second, in large size display applications, since the power supply lines of the backboard have resistance and the driving currents of all pixels are provided by a first reference voltage source VDD, the power source voltage at the area near the power supply position of the first reference voltage source VDD in the backboard is higher than the power source voltage at the area far away from the power supply position. This phenomenon is called IR Drop. Since the voltage of the first reference voltage source VDD is related to the current, the IR Drop would cause different currents at different areas, then creating mura during display. The LTPS process using P type TFTs to construct pixel units is particularly sensitive to this issue, because its storage capacitor is connected between the first reference voltage source VDD and the gate of the driving transistor DTFT, and thus the voltage change of the first reference voltage source VDD would directly influence the gate-source voltage Vgs of the driving transistor DTFT.

Third, the OLED device would have nonuniformity of electrical performance due to nonuniform film thickness during evaporation. For the a-Si or Oxide TFT process using N type TFTs to construct pixel units, its storage capacitor is connected between the gate of the driving TFT and the anode of the OLED. When the data voltage is transferred to the gate, if the anode voltages of the OLEDs of respective pixels are different, the gate-source voltages Vgs actually applied on the driving transistor DTFTs are different, such that the difference of driving currents causes display brightness difference.

Normally, an AMOLED voltage type pixel unit driving circuit is provided. Such a voltage type driving method is similar to the conventional AMLCD driving method, in which a driving unit provides a voltage signal representing a gray scale, and the voltage signal is converted into a current signal for a driving transistor inside the pixel circuit, so as to driving the OLED to realize the gray scale of brightness. Such a method has advantages of fast driving speed and easy realization, and is suitable for driving a panel with large size and is widely used in the industry. However, it is needed to design additional switch transistors and capacitor devices to compensate the nonuniformity of driving transistors DTFTs, the IR Drop and the nonuniformity of the OLEDs.

SUMMARY

At least one embodiment of the present disclosure provides a pixel structure and driving method thereof which can improve resolution.

At least one embodiment of the present disclosure provides a pixel structure comprising a plurality of pixel units and compensation units corresponding to the pixel units, each of the pixel units comprises two adjacent pixel circuits which are a first pixel circuit and a second pixel circuit, the first pixel circuit comprises a first driving transistor and a first display device, the second pixel circuit comprises a second driving transistor and a second display device, and the first pixel circuit and the second pixel circuit share the compensation unit and are controlled by a same data line;

the compensation unit is configured to adjust a gate voltage of the first driving transistor in the first pixel circuit to eliminate the influence of the threshold voltage of the first driving transistor on the driving current of the first display device, and to adjust a gate voltage of the second driving transistor in the second pixel circuit to eliminate the influence of the threshold voltage of the second driving transistor on the driving current of the second display device. The pixel structure of the present disclosure comprises a plurality of pixel unit, each pixel unit comprises two pixel circuits, and in the two pixel circuits, the threshold voltages of the driving transistors in each pixel circuit are adjusted by one compensation unit, that is, the two pixel circuits are controlled by one data line Data, wherein each pixel circuit is equivalent to one part of a normal sub-pixel unit, in other words, two adjacent sub-pixels are controlled by one and the same data line Data. Now, it is like reducing half of the data lines Data in a normal pixel structure and sharing the compensation units. At the same time, it is possible to reduce the number of TFTs in the compensation units, so as to dramatically reduce the sizes of the pixels and reduce the cost of the driving chip (IC), and further obtain higher picture quality and higher resolution (PPI).

For the above pixel structure, at least one embodiment of the present disclosure further provides a driving method for the above pixel structure, comprising:

at a threshold compensation phase, by the compensation unit, adjusting the gate voltage of the first driving transistor in the first pixel circuit to eliminate the influence of the threshold voltage of the first driving transistor on the driving current of the first display device and adjusting the gate voltage of the second driving transistor in the second pixel circuit to eliminate the influence of the threshold voltage of the second driving transistor on the driving current of the second display device.

Optionally, the compensation unit comprises a first switch transistor, a second switch transistor, a third switch transistor, a fourth switch transistor, a fifth switch transistor, a sixth switch transistor, a seventh switch transistor, an eighth switch transistor, a ninth switch transistor, a tenth switch transistor, a first storage capacitor, and a second storage capacitor;

a gate of the first switch transistor is connected to a gate of the second switch transistor, a gate of the seventh transistor, and a first light emitting control line, a source of the first switch transistor is connected to a source of the second switch transistor and a first reference voltage source, and a drain of the first switch transistor is connected to a source of the fourth switch transistor and a source of the first driving transistor;

the gate of the second switch transistor is connected to a gate of the eighth switch transistor, a drain of the second switch transistor is connected to a source of the fifth switch transistor and a source of the second driving transistor;

a gate of the third switch transistor is connected to a gate of the fourth switch transistor and a first scan line, a source of the third switch transistor is connected to a data line, a drain of the third switch transistor is connected to a second terminal of the first storage capacitor and a source of the seventh switch transistor;

a drain of the fourth switch transistor is connected to a first terminal of the first storage capacitor and a gate of the first driving transistor;

a gate of the fifth switch transistor is connected to a gate of the sixth switch transistor and a second scan line, a source and a drain of the fifth switch transistor are connected to a first terminal of the second storage capacitor and a gate of the second driving transistor;

a source of the sixth switch transistor is connected to the data line, a drain of the sixth switch transistor is connected to a second terminal of the second storage capacitor and a drain of the eighth switch transistor;

a drain of the seventh switch transistor is connected to a source of the ninth switch transistor, a drain of the first driving transistor, and a first terminal of the first display device, and a second terminal of the first display device is grounded;

a source of the eighth switch transistor is connected to a source of the tenth switch transistor, a drain of the second driving transistor, and a first terminal of the second display device, and a second terminal of the second display device is grounded;

a gate of the ninth switch transistor is connected to a gate of the tenth switch transistor and the second scan line, and a drain of the ninth switch transistor is grounded;

a drain of the tenth switch transistor is grounded.

Further optionally, the first switch transistor, the second switch transistor, the third switch transistor, the fourth switch transistor, the fifth switch transistor, the sixth switch transistor, the seventh switch transistor, the eighth switch transistor, the ninth switch transistor, the tenth switch transistor, the first driving transistor, the second driving transistor are all N type thin film transistors.

At least one embodiment of the present disclosure provides a driving method of the above pixel structure, comprising:

at a reset phase, applying a high voltage level to the first scan line, the second scan line, and the first light emitting control line such that the first switch transistor, the second switch transistor, the third switch transistor, the fourth switch transistor, the fifth switch transistor, the sixth switch transistor, the seventh switch transistor, the eighth switch transistor, the ninth switch transistor and the tenth switch transistor are all turned on and the first reference voltage source sets the potential of the first terminal of the first storage capacitor and the potential of the first terminal of the second storage capacitor as a voltage Vdd of the first reference voltage source, the data line sets both the potential of the second terminal of the first storage capacitor and the potential of the second terminal of the second storage capacitor as the first voltage V1;

at a discharge phase, applying a high voltage level to the first scan line and the second scan line and applying a low voltage level to the first light emitting control line such that the third switch transistor, the fourth switch transistor, the fifth switch transistor, the sixth switch transistor, the ninth switch transistor and the tenth switch transistor are all turned on and the first storage capacitor and the second storage capacitor are both discharged, wherein the potential of the first terminal of the first storage capacitor and the potential of the first terminal of the second storage capacitor are respectively discharged to the threshold voltage Vth1 of the first driving transistor and the threshold voltage Vth2 of the second driving transistor;

at a discharge continuation phase, applying a low voltage level to the first scan line and the first light emitting control line, applying a high voltage level to the second scan line, and applying a second voltage V2 to the data line, such that the voltage difference between the two terminals of the first storage capacitor is equal to Vth1−V1, and the voltage difference between the two terminals of the second storage capacitor is equal to Vth2−V2, wherein V1>V2;

at a voltage stabilization phase, applying a low voltage level to the first scan line, the second scan line and the first light emitting control line such that the first switch transistor, the second switch transistor, the third switch transistor, the fourth switch transistor, the fifth switch transistor, the sixth switch transistor, the seventh switch transistor, the eighth switch transistor, the ninth switch transistor and the tenth switch transistor are all turned off to stabilize the voltage difference between the two terminals of the first storage capacitor and the second storage capacitor;

at a light emitting phase, applying a low voltage level to the first scan line and the second scan line, and applying a high voltage level to the first light emitting control line, such that the first switch transistor, the second switch transistor, the seventh switch transistor and the eighth switch transistor are turned on, the potential at the second terminal of the first storage capacitor changes to the anode potential Voled1 of the first display device, the potential at the first terminal of the first storage capacitor changes to Vth1−V1+Voled1, the potential at the second terminal of the second storage capacitor changes to the anode potential Voled2 of the second display device, the potential at the first terminal of the second storage capacitor changes to Vth2−V2+Voled2, and the first driving transistor and the second driving transistor drive the first display device and the second display device to emit light respectively.

Optionally, the compensation unit comprises an eleventh switch transistor, a twelfth switch transistor, a thirteenth switch transistor, a fourteenth switch transistor, a fifteenth switch transistor, a sixteenth switch transistor, a seventeenth switch transistor, an eighteenth switch transistor, a nineteenth switch transistor, a third storage capacitor, and a fourth storage capacitor;

a gate of the eleventh switch transistor is connected to a second light emitting control line, a source of the eleventh switch transistor is connected to the first reference voltage source, a drain of the eleventh switch transistor is connected to the source of the first driving transistor and the source of the second driving transistor;

a gate of the twelfth switch transistor is connected to a third scan line, a source of the twelfth switch transistor is connected to the data line, a drain of the twelfth switch transistor is connected to a source of the thirteenth switch transistor and a first terminal of the third storage capacitor;

a gate of the thirteenth switch transistor is connected to a gate of the fourteenth switch transistor and a third light emitting control line, and a drain of the thirteenth switch transistor is grounded;

a source of the fourteenth switch transistor is connected to a first terminal of the fourth storage capacitor and a drain of the fifteenth switch transistor, and a drain of the fourteenth switch transistor is grounded;

a gate of the fifteenth switch transistor is connected to a fourth scan line, and a source of the fifteenth switch transistor is connected to the data line;

a gate of the sixteenth switch transistor is connected to a gate of the seventeenth switch transistor and a third light emitting control line, a source of the sixteenth switch transistor is connected to the gate of the first driving transistor and a second terminal of the third storage capacitor, a drain of the sixteenth switch transistor is connected to the drain of the first driving transistor and a source of the eighteenth switch transistor;

a source of the seventeenth switch transistor is connected to the gate of the second driving transistor and a second terminal of the fourth storage capacitor, a drain of the seventeenth switch transistor is connected to the drain of the second driving transistor and a source of the nineteenth switch transistor;

a gate of the eighteenth switch transistor is connected to a gate of the nineteenth switch transistor and a fourth light emitting control line, a drain of the eighteenth switch transistor is connected to the first terminal of the first display device, and the second terminal of the first display device is grounded;

a drain of the nineteenth switch transistor is connected to the first terminal of the second display device, and the second terminal of the second display device is grounded.

Further optionally, the pixel structure further comprises capacitive touch units and light sensitive type touch units connected to the compensation units;

the capacitive touch unit is configured to generate a corresponding electrical signal according to a touch signal and realize touch and control by a finger;

the light sensitive type touch unit is configured to generate a corresponding electrical signal according to an illumination intensity signal and realize touch and control by a laser pen.

Further optionally, the capacitive touch unit comprises a first capacitive transistor, a second capacitive transistor, a third capacitive transistor, a fifth storage capacitor and a touch electrode;

a gate of the first capacitive transistor is connected to the light sensitive type touch unit and the third light emitting control line, a source of the first capacitive transistor is connected to the data line, a drain of the first capacitive transistor is connected to a first terminal of the fifth storage capacitor and a gate of the second capacitive transistor;

a source of the second capacitive transistor is connected to a drain of the third capacitive transistor, a drain of the second capacitive transistor is connected to a second terminal of the fifth storage capacitor and a common electrode;

a gate of the third capacitive transistor is connected to the third scan line, a source of the third capacitive transistor is connected to a read line;

the touch electrode is connected to the gate of the second capacitive transistor.

Further optionally, the light sensitive type touch unit comprises a first light sensitive type transistor, a second light sensitive type transistor, a third light sensitive type transistor, a light sensitive transistor, and a sixth storage capacitor;

a gate of the light sensitive transistor is connected to a source of the first light sensitive type transistor, a source of the second light sensitive type transistor and a first terminal of the sixth storage capacitor, a drain of the light sensitive transistor is connected to a second terminal of the sixth storage capacitor and a source of the third light sensitive type transistor, and a source of the light sensitive transistor is connected to a source of the second light sensitive type transistor;

a gate of the first light sensitive type transistor is connected to the capacitive touch unit, and a drain of the first light sensitive type transistor is grounded;

a gate of the second light sensitive type transistor is connected to the fourth scan line, a drain of the second light sensitive type transistor is connected to the data line;

a gate of the third light sensitive type transistor is connected to the fourth light emitting control line, and a drain of the third light sensitive type transistor is connected to the read line.

Further optionally, the eleventh switch transistor, the twelfth switch transistor, the thirteenth switch transistor, the fourteenth switch transistor, the fifteenth switch transistor, the sixteenth switch transistor, the seventeenth switch transistor, the eighteenth switch transistor, the nineteenth switch transistor, the first driving transistor and the second driving transistor are all P type thin film transistors.

Further optionally, the first capacitive transistor, the second capacitive transistor and the third capacitive transistor are all P type thin film transistors.

Further optionally, the first light sensitive type transistor, the second light sensitive type transistor and the third light sensitive type transistor are all P type thin film transistors, and the light sensitive transistor is an N type thin film transistor.

At least one embodiment of the present disclosure further provides a driving method of the above pixel structure, comprising:

at a reset phase, applying a high voltage level to the third scan line, the fourth scan line and the fourth light emitting control line, and applying a low voltage level to the second light emitting control line and the third light emitting control line, such that the eleventh switch transistor, the thirteenth switch transistor, the fourteenth switch transistor, the sixteenth switch transistor, and the seventeenth switch transistor are all turned on, the third storage capacitor and the fourth storage capacitor are both discharged, the third storage capacitor is discharged to the extent that the potential at its second terminal is Vdd−Vth1, the fourth storage capacitor is discharged to the extent that the potential at its second terminal is Vdd−Vth2, the first terminal of the third storage capacitor and the first terminal of the fourth storage capacitor are both grounded and have the potential of 0V, the voltage difference between the two terminals of the third storage capacitor is Vdd−Vth1, and the voltage difference between the two terminals of the fourth storage capacitor is Vdd−Vth2, wherein Vdd is the voltage of the first reference voltage source, Vth1 is the threshold voltage of the first driving transistor, and Vth2 is the threshold voltage of the second driving transistor;

at a jump phase of the first pixel circuit, applying a low voltage level to the third scan line, and applying a high voltage level to the fourth scan line, the fourth light emitting control line, the second light emitting control line and the third light emitting control line, such that the twelfth switch transistor is turned on, the data line charges the first terminal of the third storage capacitor to the third voltage V3, and now the potential at the second terminal of the third storage capacitor is Vdd−Vth1+V3;

at a jump phase of the second pixel circuit, applying a low voltage level to the fourth scan line, and applying a high voltage level to the third scan line, the second light emitting control line, the third light emitting control line and the fourth light emitting control line, such that the fifteenth switch transistor is turned on, the data line charges the first terminal of the fourth storage capacitor to a fourth voltage V4 and now the potential at the second terminal of the fourth storage capacitor is Vdd−Vth2+V4, wherein V4>V3;

at a light emitting phase, applying a high voltage level to the third scan line, the fourth scan line and the third light emitting control line, and applying a low voltage level to the second light emitting control line and the fourth light emitting control line, such that the eleventh switch transistor, the eighteenth switch transistor and the nineteenth switch transistor are turned on, and the first driving transistor and the second driving transistor drive the first display device and the second display device to emit light respectively.

Optionally, the driving method further comprises that:

at the reset phase, the first capacitive transistor is turned on, and the data line resets the potential at the touch point of a finger to the third voltage V3;

the first light sensitive type transistor is turned on to cause the sixth storage capacitor and the light sensitive transistor to be grounded and reset;

at the jump phase of the first pixel circuit, the second capacitive transistor and the third capacitive transistor are turned on, and the common electrode is connected with a coupling pulse signal to provide the potential at one terminal of the fifth storage capacitor and be as the source voltage of the second capacitive transistor;

all the transistors in the light sensitive type touch unit are turned off to be in a halt state;

at the jump phase of the second pixel circuit, the first capacitive transistor, the second capacitive transistor and the third capacitive transistor in the capacitive touch unit are all turned off to be in a halt state;

the second light sensitive type transistor in the light sensitive type touch unit is turned on to output the fourth voltage V4 to the sixth storage capacitor to charge the sixth storage capacitor;

at the light emitting phase, the first capacitive transistor, the second capacitive transistor and the third capacitive transistor in the capacitive touch unit keep being turned off to be in a halt state;

the light sensitive type touch unit collects the touch signal through the read line.

At least one embodiment of the present disclosure further provides a display apparatus comprising the above pixel structure.

DETAILED DESCRIPTION

In order to make those skilled in the art better understand technical solutions of the present disclosure, further detailed description of the present disclosure will be made in connection with figures and specific embodiments. In the figures, the same reference symbols are used to represent the same elements.

Figure 1:
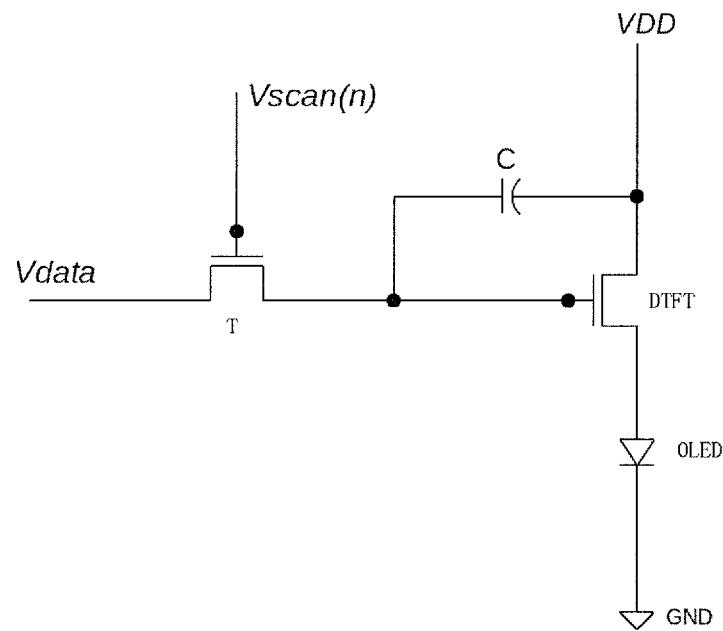
FIG. 1 is a circuit structure diagram of a normal voltage driven type pixel unit.

FIG. 1 is a normal circuit structure (2T1C) of a voltage driven type pixel unit consisting of 2 TFTs and 1 capacitor, in which the switch transistor T transmits the voltage on the data line to the gate of the driving transistor DTFT, and the driving transistor converts the data voltage into a corresponding current to be supplied to the OLED device. During normal operation, the driving transistor DTFT should be at the saturation area and provide constant current within one-line scan time. The current can be expressed as:

$$I_{OLED} = \frac{1}{2}\mu_n \cdot Cox \cdot \frac{W}{L} \cdot (Vdata - Voled - Vthn)^2$$

where $\mu_n$ is the carrier mobility, $C_{ox}$ is the capacitance of the gate oxide layer, W/L is the aspect ratio of the transistor, Vdata is the data voltage, Voled is the operation voltage of the OLED which is shared by all pixel units, and Vthn is the threshold voltage of the transistor. For an enhancement type driving transistor DTFT, Vthn is a positive value, and for a depletion type TFT, Vthn is a negative value.

Figure 2:
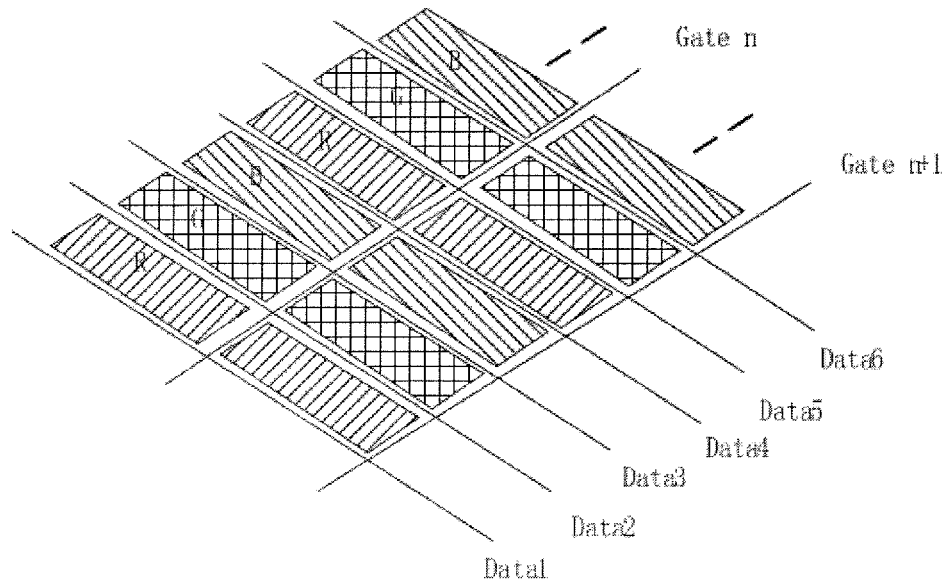
FIG. 2 is a schematic diagram of a normal pixel structure.

Although normal pixel unit driving circuits are widely used, they still inevitably have the following problems. If Vthn is different between different pixel units, the current is different. If Vthn of pixels drifts with time, currents at different time may be different, resulting in an afterimage, and different operation voltages of OLEDs caused by non-unifomity of OLED devices would also result in current difference. In order to avoid the influence of different Vthn between different pixel units on the pixel circuit, threshold compensation units are usually added in the pixel circuit to eliminate the influence of Vthn of the pixels on the pixel unit. However, it brings the following problems at the same time. FIG. 2 is a schematic diagram of normal pixel structures. As shown in FIG. 2, each pixel structure of the pixel structures is arranged in row and in column. If each pixel is arranged with one compensation unit, because there are many compensation units, that is, the number of TFTs and storage capacitors is increased, the decrease of the pixel size will be limited dramatically.

First Embodiment

Figure 3:
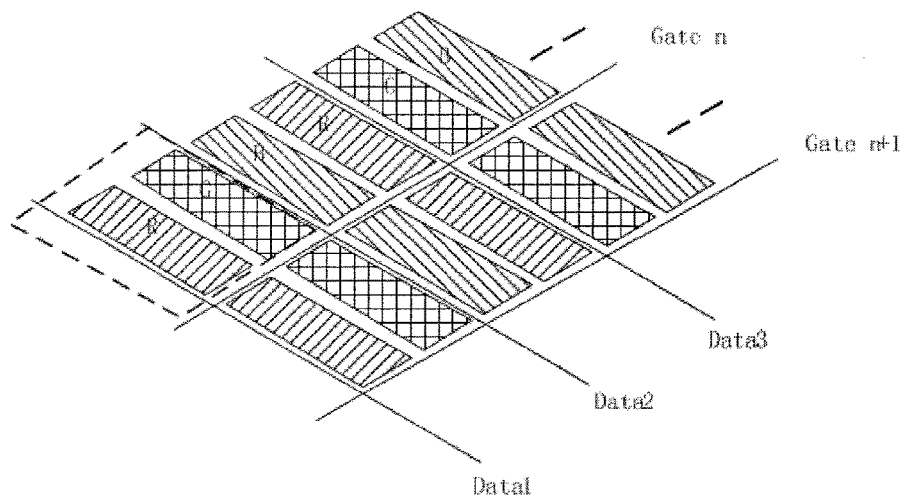
FIG. 3 is a schematic diagram of a pixel structure according to a first embodiment of the present disclosure.

FIG. 3 is a schematic diagram of a pixel structure according to a first embodiment of the present disclosure. As shown in FIG. 3, the present embodiment provides a pixel structure comprising a plurality of pixel units (what is circled in the dashed line frame is one pixel unit) and compensation units corresponding to the pixel units. Each of the pixel units comprises two adjacent pixel circuits which are a first pixel circuit and a second pixel circuit, the first pixel circuit comprises a first driving transistor and a first display device, the second pixel circuit comprises a second driving transistor and a second display device, wherein the first pixel circuit and the second pixel circuit share the compensation unit and are controlled by a same data line Data. The compensation unit is configured to adjust a gate voltage of the first driving transistor in the first pixel circuit to eliminate the influence of the threshold voltage of the first driving transistor on the driving current of the first display device, and to adjust a gate voltage of the second driving transistor in the second pixel circuit to eliminate the influence of the threshold voltage of the second driving transistor on the driving current of the second display device.

The pixel structure of the present disclosure comprises a plurality of pixel units, each pixel unit comprises two pixel circuits, and the two pixel circuits adjust the threshold voltages of the driving transistors in each pixel circuit by one compensation unit, that is, the two pixel circuits are controlled by one data line Data, in other words, two adjacent sub-pixels are controlled by one and the same data line Data. Now, it is like reducing half of the data lines Data in a normal pixel structure and sharing the compensation units. At the same time, it is possible to reduce the number of TFTs in the compensation units, so as to dramatically reduce the sizes of the pixels and reduce the cost of the driving chip (IC), and further obtain higher picture quality and higher resolution (PPI).

The present embodiment further provides a driving method of the above pixel structure, in particular, comprising:

at a threshold compensation phase, by the compensation unit, adjusting the gate voltage of the first driving transistor in the first pixel circuit to eliminate the influence of the threshold voltage of the first driving transistor on the driving current of the first display device and adjusting the gate voltage of the second driving transistor in the second pixel circuit to eliminate the influence of the threshold voltage of the second driving transistor on the driving current of the second display device.

The driving method of the pixel structure according to the present embodiment compensates the threshold voltages of the driving transistors in two adjacent pixel circuits simultaneously through one compensation unit, making the driving process of such a structure much easier.

Second Embodiment

Figure 4:
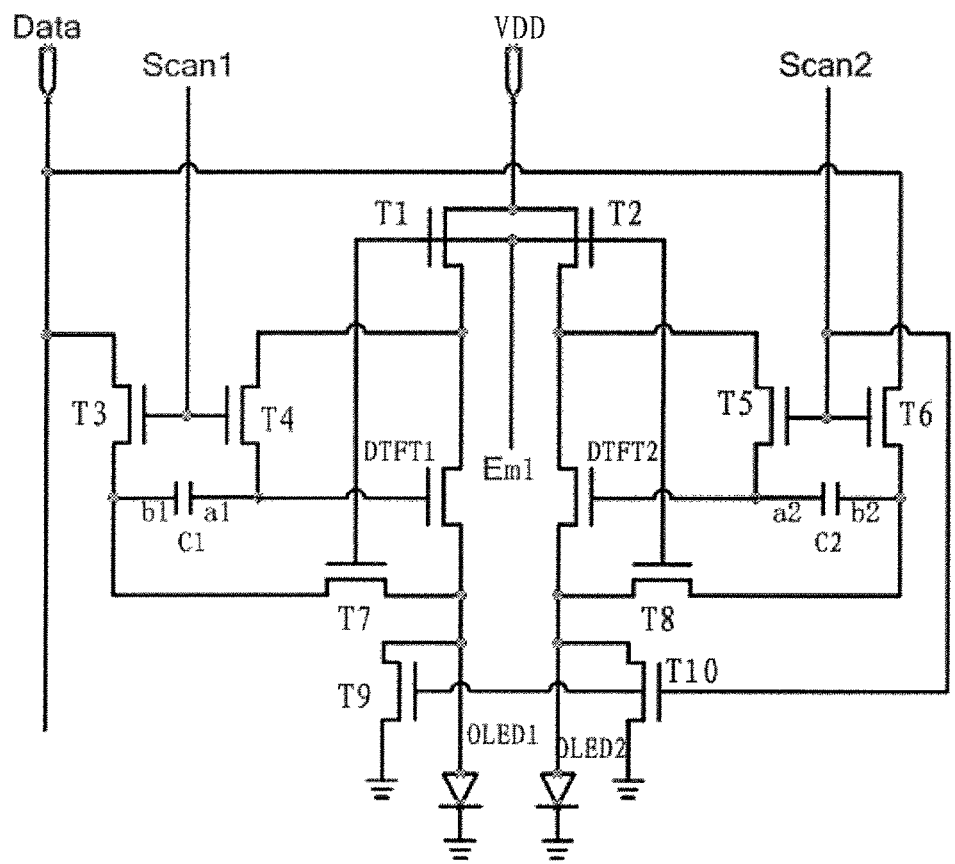
FIG. 4 is a circuit principle diagram of a pixel structure according to a second embodiment of the present disclosure.

FIG. 4 is a circuit principle diagram of a pixel structure according to a second embodiment of the present disclosure. As shown in FIG. 4, the pixel structure provided by the present embodiment comprises a plurality of pixel units and compensation units corresponding to the pixel units. Each of the pixel units comprises two adjacent pixel circuits which are a first pixel circuit and a second pixel circuit, the first pixel circuit comprises a first driving transistor DTFT1 and a first display device OLED1, and the second pixel circuit comprises a second driving transistor DTFT2 and a second display device OLED2, wherein the first pixel circuit and the second pixel circuit share the compensation unit and are controlled by the same data line Data. The compensation unit is configured to adjust a gate voltage of the first driving transistor DTFT1 in the first pixel circuit to eliminate the influence of the threshold voltage of the first driving transistor DTFT1 on the driving current of the first display device OLED1, and to adjust a gate voltage of the second driving transistor DTFT2 in the second pixel circuit to eliminate the influence of the threshold voltage of the second driving transistor DTFT2 on the driving current of the second display device OLED2. In particular, the compensation unit comprises a first switch transistor T1, a second switch transistor T2, a third switch transistor T3, a fourth switch transistor T4, a fifth switch transistor T5, a sixth switch transistor T6, a seventh switch transistor T7, an eighth switch transistor T8, a ninth switch transistor T9, a tenth switch transistor T10, a first storage capacitor C1, and a second storage capacitor C2; a gate of the first switch transistor T1 is connected to a gate of the second switch transistor T2, a gate of the seventh transistor T7, and a first light emitting control line Em1, a source of the first switch transistor T1 is connected to a source of the second switch transistor T2 and a first reference voltage source VDD, and a drain of the first switch transistor T1 is connected to a source of the fourth switch transistor T4 and a source of the first driving transistor DTFT1; the gate of the second switch transistor T2 is connected to a gate of the eighth switch transistor T8, a drain of the second switch transistor T2 is connected to a source of the fifth switch transistor T5 and a source of the second driving transistor DTFT2; a gate of the third switch transistor T3 is connected to a gate of the fourth switch transistor T4 and a first scan line Scan1, a source of the third switch transistor T3 is connected to a data line Data, a drain of the third switch transistor T3 is connected to a second terminal b1 of the first storage capacitor C1 and a source of the seventh switch transistor T7; a drain of the fourth switch transistor T4 is connected to a first terminal a1 of the first storage capacitor C1 and a gate of the first driving transistor DTFT1; a gate of the fifth switch transistor T5 is connected to a gate of the sixth switch transistor T6 and a second scan line Scan2, a drain of the fifth switch transistor T5 is connected to a first terminal a2 of the second storage capacitor C2 and a gate of the second driving transistor DTFT2; a source of the sixth switch transistor T6 is connected to the data line Data, a drain of the sixth switch transistor T6 is connected to a second terminal b2 of the second storage capacitor C2 and a drain of the eighth switch transistor T8; a drain of the seventh switch transistor T7 is connected to a source of the ninth switch transistor T9, a drain of the first driving transistor DTFT1, and a first terminal of the first display device OLED1, and a second terminal of the first display device OLED1 is grounded; a source of the eighth switch transistor T8 is connected to a source of the tenth switch transistor T10, a drain of the second driving transistor DTFT2, and a first terminal of the second display device OLED2, and a second terminal of the second display device is grounded; a gate of the ninth switch transistor T9 is connected to a gate of the tenth switch transistor T10 and the second scan line Scan2, and a drain of the ninth switch transistor T9 is grounded; a drain of the tenth switch transistor T10 is grounded.

In order to better fabricate such a pixel structure and better control each pixel unit, for example, the first switch transistor T1, the second switch transistor T2, the third switch transistor T3, the fourth switch transistor T4, the fifth switch transistor T5, the sixth switch transistor T6, the seventh switch transistor T7, the eighth switch transistor T8, the ninth switch transistor T9, the tenth switch transistor T10, the first driving transistor DTFT1, the second driving transistor DTFT2 are all N type thin film transistors.

Figure 5:
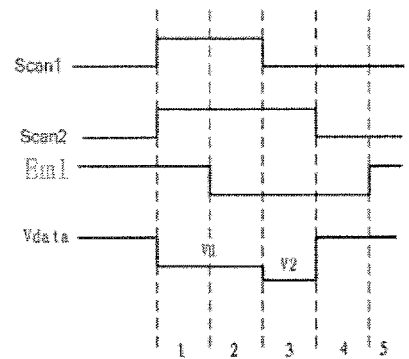
FIG. 5 is a time sequence diagram of a pixel structure shown in FIG. 4.

FIG. 5 is time sequence diagram of the pixel structure shown in FIG. 4. In the following, a driving method for the pixel structure shown in FIG. 4 according to an embodiment of the present disclosure is described in detail in connection with FIG. 4 and FIG. 5. The method comprising the following steps.

At a reset phase (the first time period), a high voltage level is applied to the first scan line Scan1, the second scan line Scan2, and the first light emitting line Em1. Now, the first switch transistor T1, the second switch transistor T2, the third switch transistor T3, the fourth switch transistor T4, the fifth switch transistor T5, the sixth switch transistor T6, the seventh switch transistor T7, the eighth switch transistor T8, the ninth switch transistor T9 and the tenth switch transistor T10 are all turned on and the first reference voltage source VDD sets the potential of the first terminal a1 of the first storage capacitor C1 and the potential of the first terminal a2 of the second storage capacitor C2 as a voltage Vdd of the first reference voltage source. A first voltage V1 is applied to the data line Data. Now, since the third switch transistor T3, the fourth switch transistor T4, the fifth switch transistor T5 and the sixth switch transistor T6 are all turned on, the potential of the second terminal b1 of the first storage capacitor C1 and the potential of the second terminal b2 of the second storage capacitor C2 are both set as the first voltage V1, that is a1=Vdd, b1=V1, a2=Vdd, b2=V1.

At a discharge phase (the second time period), a high voltage level is applied to the first scan line Scan 1 and the second scan line Scan2, and a low voltage level is applied to the first light emitting control line Em1. Now, the third switch transistor T3, the fourth switch transistor T4, the fifth switch transistor T5, the sixth switch transistor T6, the ninth switch transistor T9 and the tenth switch transistor T10 are all turned on, and the first storage capacitor C1 and the second storage capacitor C2 are both discharged, wherein the potential of the first terminal a1 of the first storage capacitor C1 and the potential of the first terminal a2 of the second storage capacitor C2 are respectively discharged to the threshold voltage Vth1 of the first driving transistor DTFT1 and the threshold voltage Vth2 of the second driving transistor DTFT2, that is, a1=Vth1, and a2=Vth2. In addition, since the ninth switch transistor T9 and the tenth switch transistor T10 are turned on such that the current in the circuit will not flow through the first display device OLED1 and the second display device OLED2, which indirectly reduces the loss of the first display device OLED1 and the second display device OLED2.

At a discharge continuation phase (the third time period), a low voltage level is applied to the first scan line Scan1 and the first light emitting control line Em1, a high voltage level is applied to the second scan line Scan2, and a second voltage V2 is applied to the data line Data. Now, the potential at the second terminal b2 of the second storage capacitor C1 will accordingly become V2 while the potential at the first terminal a2 of the second storage capacitor C2 remains Vth2, such that the voltage difference between the two terminals of the first storage capacitor C1 is equal to Vth1−V1, and the voltage difference between the two terminals of the second storage capacitor C2 is equal to Vth2−V2, wherein V1>V2.

At a voltage stabilization phase (the fourth time period), a low voltage level is applied to the first scan line Scan1, the second scan line Scan2 and the first light emitting control line Em1. The first switch transistor T1, the second switch transistor T2, the third switch transistor T3, the fourth switch transistor T4, the fifth switch transistor T5, the sixth switch transistor T6, the seventh switch transistor T7, the eighth switch transistor T8, the ninth switch transistor T9 and the tenth switch transistor T10 are all turned off to stabilize the voltage difference between the two terminals of the first storage capacitor C1 and the voltage difference between the two terminals of the second storage capacitor C2 and prepare for a light emitting phase.

At the light emitting phase (the fifth time period), a low voltage level is applied to the first scan line Scan1 and the second scan line Scan2, and a high voltage level is applied to the first light emitting control line Em1. The first switch transistor T1, the second switch transistor T2, the seventh switch transistor T7 and the eighth switch transistor T8 are turned on, the potential at the second terminal b1 of the first storage capacitor C1 changes from V1 to the anode potential Voled1 of the first display device OLED1, the potential at the first terminal a1 of the first storage capacitor C1 changes to Vth1−V1+Voled1, the potential at the second terminal b2 of the second storage capacitor C2 changes from V2 to the anode potential Voled2 of the second display device OLED2, the potential at the first terminal a2 of the second storage capacitor C2 changes to Vth2−V2+Voled2, and the first driving transistor DTFT1 and the second driving transistor DTFT2 drive the first display device OLED1 and the second display device OLED2 to emit light respectively.

Now, the current flowing through the first display device OLED1 can be obtained according to a formula for saturated current of a TFT as follows:

$$Ioled1 = K(VGS - Vth1)^2$$
$$= K[(Vth1 - V1 + Voled1) - Voled1 - Vth1]^2$$
$$= K \cdot (V1)^2$$

Likely, the current flowing through the second display device OLED2 is Ioled2=K·(V2)².

It can be seen from the obtained current values flowing through the first display devices OLED1 and the second display device OLED2 that the pixel structure can not only realize high resolution display but also avoid the influence of the threshold voltages of the driving transistors on the pixel structure, such that the display of the pixel structures according to the embodiment of the present disclosure is more uniform.

Third Embodiment

Figure 6:
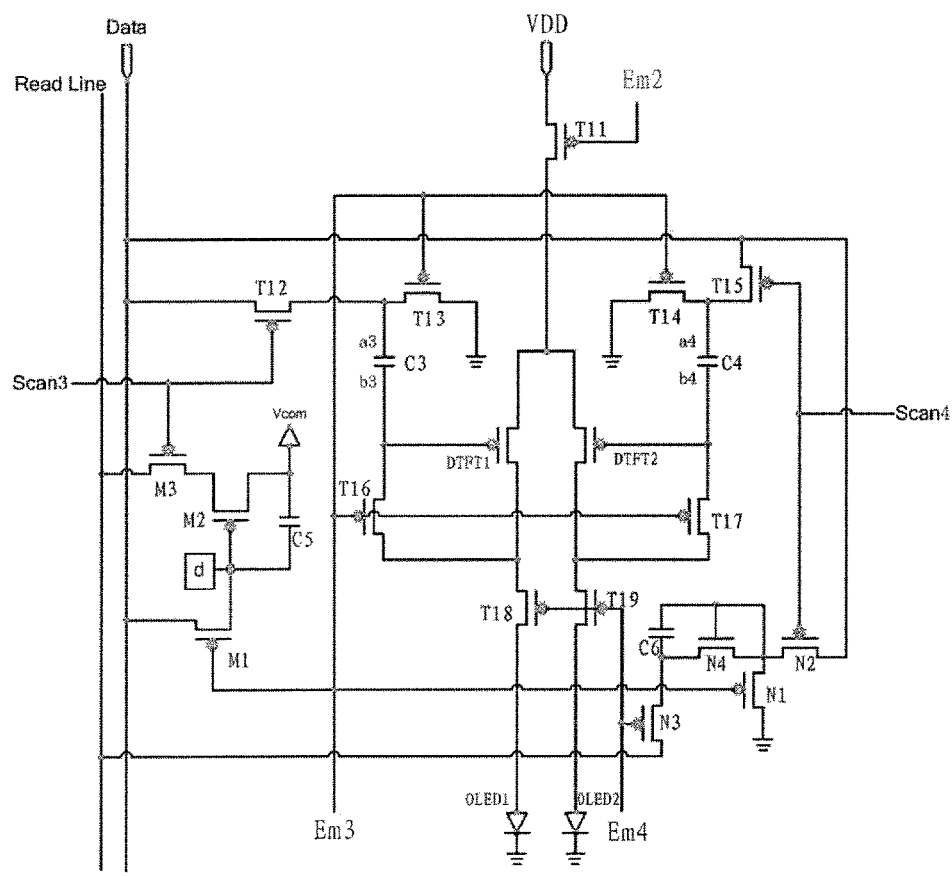
FIG. 6 is another circuit principle diagram of a pixel structure according to a third embodiment of the present disclosure.

FIG. 6 is a circuit principle diagram of a pixel structure according to a third embodiment of the present disclosure. The pixel structure further comprises capacitive touch units and light sensitive type touch units. As shown in FIG. 6, the pixel structure comprises a plurality of pixel units and compensation units corresponding to the pixel units, the capacitive touch units and the light sensitive type touch units. Each of the pixel units comprises two adjacent pixel circuits which are a first pixel circuit and a second pixel circuit, the first pixel circuit comprises a first driving transistor DTFT1 and a first display device OLED1, and the second pixel circuit comprises a second driving transistor DTFT2 and a second display device OLED2, wherein the first pixel circuit and the second pixel circuit share the compensation unit and are controlled by the same data line Data. The compensation unit is configured to adjust a gate voltage of the first driving transistor DTFT1 in the first pixel circuit to eliminate the influence of the threshold voltage of the first driving transistor DTFT1 on the driving current of the first display device OLED1, and to adjust a gate voltage of the second driving transistor DTFT2 in the second pixel circuit to eliminate the influence of the threshold voltage of the second driving transistor DTFT2 on the driving current of the second display device OLED2. The capacitive touch unit is configured to generate a corresponding electrical signal according to a touch signal and realize touch and control by a finger; and the light sensitive type touch unit is configured to generate a corresponding electrical signal according to an illumination intensity signal and realize touch and control by a laser pen.

The compensation unit comprises an eleventh switch transistor T11, a twelfth switch transistor T12, a thirteenth switch transistor T13, a fourteenth switch transistor T14, a fifteenth switch transistor T15, a sixteenth switch transistor T16, a seventeenth switch transistor T17, an eighteenth switch transistor T18, a nineteenth switch transistor T19, a third storage capacitor C3, and a fourth storage capacitor C4; wherein a gate of the eleventh switch transistor T11 is connected to a second light emitting control line Em2, a source of the eleventh switch transistor T11 is connected to the first reference voltage source VDD, a drain of the eleventh switch transistor T11 is connected to the source of the first driving transistor DTFT1 and the source of the second driving transistor DTFT2; a gate of the twelfth switch transistor T12 is connected to a third scan line Scan3, a source of the twelfth switch transistor T12 is connected to the data line Data, a drain of the twelfth switch transistor T12 is connected to a source of the thirteenth switch transistor T13 and a first terminal a3 of the third storage capacitor C3; a gate of the thirteenth switch transistor T13 is connected to a gate of the fourteenth switch transistor T14 and a third light emitting control line Em3, and a drain of the thirteenth switch transistor T13 is grounded; a source of the fourteenth switch transistor T14 is connected to a first terminal a4 of the fourth storage capacitor C4 and a drain of the fifteenth switch transistor T15, and a drain of the fourteenth switch transistor T14 is grounded; a gate of the fifteenth switch transistor T15 is connected to a fourth scan line Scan4, and a source of the fifteenth switch transistor T15 is connected to the data line Data; a gate of the sixteenth switch transistor T16 is connected to a gate of the seventeenth switch transistor T17 and a third light emitting control line Em3, a source of the sixteenth switch transistor T16 is connected to the gate of the first driving transistor DTFT1 and a second terminal b3 of the third storage capacitor C3, a drain of the sixteenth switch transistor T16 is connected to the drain of the first driving transistor DTFT1 and a source of the eighteenth switch transistor T18; a source of the seventeenth switch transistor T17 is connected to the gate of the second driving transistor DTFT2 and a second terminal b4 of the fourth storage capacitor C4, a drain of the seventeenth switch transistor T17 is connected to the drain of the second driving transistor DTFT2 and a source of the nineteenth switch transistor T19; a gate of the eighteenth switch transistor T18 is connected to a gate of the nineteenth switch transistor T19 and a fourth light emitting control line Em4, a drain of the eighteenth switch transistor T18 is connected to the first terminal of the first display device OLED1, and the second terminal of the first display device OLED1 is grounded; a drain of the nineteenth switch transistor T19 is connected to the first terminal of the second display device OLED2, and the second terminal of the second display device OLED2 is grounded.

Optionally, the eleventh switch transistor T11, the twelfth switch transistor T12, the thirteenth switch transistor T13, the fourteenth switch transistor T14, the fifteenth switch transistor T15, the sixteenth switch transistor T16, the seventeenth switch transistor T17, the eighteenth switch transistor T18, the nineteenth switch transistor T19, the first driving transistor DTFT1, the second driving transistor DTFT2 are all P type thin film transistors.

The capacitive touch unit comprises a first capacitive transistor M1, a second capacitive transistor M2, a third capacitive transistor M3, a fifth storage capacitor C5 and a touch electrode d, wherein a gate of the first capacitive transistor M1 is connected to the light sensitive type touch unit and the third light emitting control line Em3, a source of the first capacitive transistor M1 is connected to the data line Data, a drain of the first capacitive transistor M1 is connected to a first terminal of the fifth storage capacitor C5 and a gate of the second capacitive transistor M2; a source of the second capacitive transistor M2 is connected to a drain of the third capacitive transistor M3, a drain of the second capacitive transistor M2 is connected to a second terminal of the fifth storage capacitor C5 and a common electrode Vcom; a gate of the third capacitive transistor M3 is connected to the third scan line Scan3, a source of the third capacitive transistor M3 is connected to a read line Readline. The touch electrode d is connected to a gate of M2, and since the gate of M2 is also connected to one terminal of C5, the touch electrode d is also connected to the capacitor C5. Therefore, the capacitor C5 functions to maintain the voltage of the touch electrode d.

With the capacitive touch unit of such a structure, when a user performs touch operation, induced capacitance will be created between a finger of the user or another touch device and the touch electrode connected to the sensing capacitor. Accurate detection of the touch position can be realized by measuring the position of the induced capacitance.

The light sensitive type touch unit comprises a first light sensitive type transistor N1, a second light sensitive type transistor N2, a third light sensitive type transistor N3, a light sensitive transistor N4, and a sixth storage capacitor C6, wherein a gate of the light sensitive transistor N4 is connected to a source of the first light sensitive type transistor N1, a source of the second light sensitive type transistor N2 and a first terminal of the sixth storage capacitor C6, a drain of the light sensitive transistor N4 is connected to a second terminal of the sixth storage capacitor C6 and a source of the third light sensitive type transistor N3, and a source of the light sensitive transistor N4 is connected to a source of the second light sensitive type transistor N2; a gate of the first light sensitive type transistor N1 is connected to the capacitive touch unit, and a drain of the first light sensitive type transistor N1 is grounded; a gate of the second light sensitive type transistor N2 is connected to the fourth scan line Scan4, a drain of the second light sensitive type transistor N2 is connected to the data line Data; a gate of the third light sensitive type transistor N3 is connected to the fourth light emitting control line Em4, and a drain of the third light sensitive type transistor N3 is connected to the read line.

Optionally, the first capacitive transistor M1, the second capacitive transistor M2, the third capacitive transistor M3, the first light sensitive type transistor N1, the second light sensitive type transistor N2, and the third light sensitive type transistor N3 are all P type TFTs, and the light sensitive transistor N4 is an N type TFT.

Figure 7:
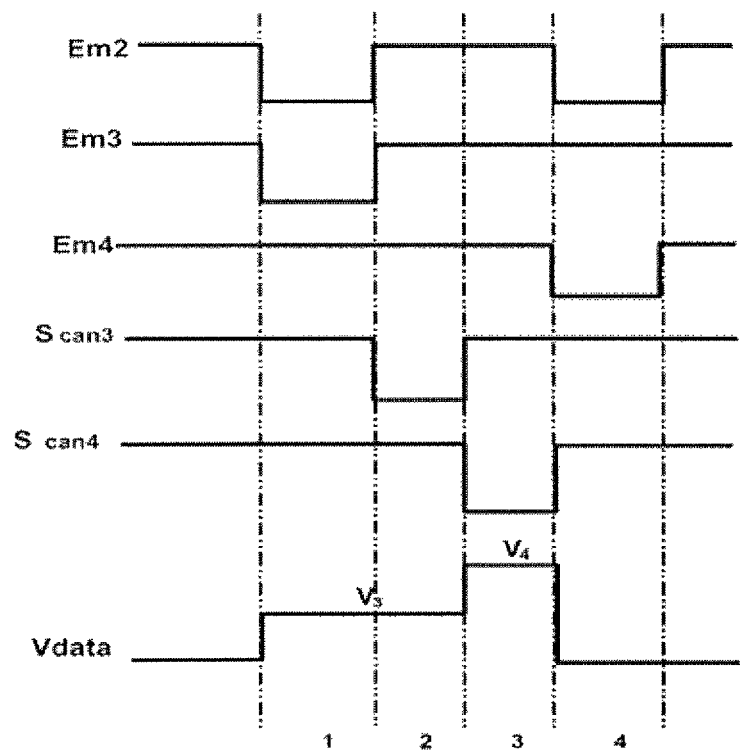
FIG. 7 is a time sequence diagram of a pixel structure shown in FIG. 6.

FIG. 7 is time sequence diagram of the pixel structure shown in FIG. 6. In the following, a driving method for the pixel structure shown in FIG. 6 according to an embodiment of the present disclosure is described in detail in connection with FIG. 6 and FIG. 7. The method comprising the following steps.

at a reset phase (the first time period), a high voltage level is applied to the third scan line Scan3, the fourth scan line Scan4 and the fourth light emitting control line Em4, and a low voltage level is applied to the second light emitting control line Em2 and the third light emitting control line Em3.

Now, in the compensation unit, the eleventh switch transistor T11, the thirteenth switch transistor T13, the fourteenth switch transistor T14, the sixteenth switch transistor T16, and the seventeenth switch transistor T17 are all turned on, the third storage capacitor C3 and the fourth storage capacitor C4 are both discharged, the third storage capacitor C3 is discharged to the extent that the potential at its second terminal b3 is Vdd−Vth1, and the fourth storage capacitor C4 is discharged to the extent that the potential at its second terminal b4 is Vdd−Vth2. During this discharge procedure, the current still does not pass through the OLED. The first terminal a3 of the third storage capacitor C3 and the first terminal a4 of the fourth storage capacitor C4 are both grounded and have the potential of 0V, the voltage difference between the two terminals of the third storage capacitor C3 is Vdd−Vth1, and the voltage difference between the two terminals of the fourth storage capacitor C4 is Vdd−Vth2, wherein Vdd is the voltage of the first reference voltage source VDD, Vth1 is the threshold voltage of the first driving transistor DTFT1, and Vth2 is the threshold voltage of the second driving transistor DTFT2.

In the capacitive touch unit, the first capacitive transistor M1 is turned on, the voltage Vdata input by the data line Data provides the reset signal, and now Vdata is V3. This procedure resets the touch unit. The potential at d is V3, the second capacitive transistor M2 and the third capacitive transistor M3 are connected with a high voltage level and are turned off now. This procedure prepares for finger touch.

In the light sensitive type unit, the first light sensitive type transistor N1 is turned on to cause the sixth storage capacitor C6 and the light sensitive transistor N4 to be grounded and reset with the potential of 0V, preparing for light sensitive touch operation in the next phase. Now, the second light sensitive type transistor N2, the third light sensitive type transistor N3 and the light sensitive transistor N4 are turned off.

At a jump phase of the first pixel circuit (the second time period), a low voltage level is applied to the third scan line Scan3, and a high voltage level is applied to the fourth scan line Scan4, the fourth light emitting control line Em4, the second light emitting control line Em2 and the third light emitting control line Em3.

Now, in the compensation unit, the twelfth switch transistor T12 is turned on, and other switch transistors are all turned off. The data line Data charges the potential of the first terminal a3 of the third storage capacitor C3 from 0V to the third voltage V3 while the second terminal b3 of the third storage capacitor C3 is floated. Therefore, in order to maintain the voltage difference (Vdd−Vth1) between a3 and b3, the potential at the second terminal b3 of the third storage capacitor C3 (the gate of the first driving transistor DTFT1) would jump by the same voltage. Now, the potential at the second terminal b3 of the third storage capacitor C3 is jumped to Vdd−Vth1+V3.

In the capacitance touch unit, the first capacitive transistor M1 is turned off, and the second capacitive transistor M2 and the third capacitive transistor M3 are turned on. At this phase, the coupling pulse signal (the common electrode Vcom) provides the potential at one terminal of the fifth storage capacitor C5 to form coupling capacitance at one hand, and it's another important function is to operate as the potential of the source of the second capacitive transistor M2. The touch of a finger directly causes to reduce the gate potential of the second capacitive transistor M2. Only when the gate-source voltage of the second capacitance transistor M2 satisfies the turning-on condition of the transistor, a signal can pass through the second capacitive transistor M2. This time period is called as the buffer phase of the capacitive touch unit, that is, to "wait for" reduction of the gate potential of the second capacitive transistor M2 which is mainly due to the touch of the finger. Now, when the potential reduction of the point d directly caused by the intervention of the finger reaches the condition for the turning on of the second capacitive transistor M2, the I&V characteristic curve is in the amplification region, and the second capacitive transistor M2 passes and amplifies the coupling pulse signal as an amplification transistor. The amplification of the signal helps collection of terminal signals. The third scan signal (the horizontal (X direction) scan signal) input by the third scan line Scan 3 has the collection function. At the same time, the read line Read Line collects signals in the Y direction. As such, the X, Y coordinates of the finger touch position are determined. This procedure can collect the coordinate position at any time as long as a finger performs touch. Now, the read line Read Line performs collection of touch signals for the first time.

In the light sensitive type touch unit, the first light sensitive type transistor N1, the second light sensitive type transistor N2, the third light sensitive type transistor N3 and the light sensitive transistor N4 are turned off to be in a halt state.

At a jump phase of the second pixel circuit (the third time period), a low voltage level is applied to the fourth scan line Scan4, and a high voltage level is applied to the third scan line Scan3, the second light emitting control line Em2, the third light emitting control line Em3 and the fourth light emitting control line Em4.

Now, in the compensation unit, the fifteenth switch transistor T15 is turned on, the data line Data charges the first terminal a4 of the fourth storage capacitor C4 from 0V to a fourth voltage V4 on the data line Data, but the second terminal b4 of the fourth storage capacitor C4 is floated. Therefore, in order to maintain the voltage difference (Vdd−Vth2) between a4 and b4, the potential at the second terminal b4 of the fourth storage capacitor C4 (the gate of the second driving transistor DTFT2) would jump by the same voltage. Now the potential at the second terminal b4 of the fourth storage capacitor C4 is Vdd−Vth2+V4.

In the capacitive touch unit, the first capacitive transistor M1, the second capacitive transistor M2 and the third capacitive transistor M3 are all turned off to be in a halt state.

In the light sensitive type touch unit, the gate and the source of the light sensitive transistor T4 are connected, the first light sensitive type transistor N1 is turned off, the second light sensitive type transistor N2 is turned on, and the coupling voltage V4 is output. Now, the potential difference stored by the sixth storage capacitor C6 is a fixed value. When a light irradiates onto this unit, the illumination intensity received by the light sensitive transistor increases, the charging current increases, and the voltage will be temperately stored in the two terminals of the sixth storage capacitor C6 to wait for the read procedure in the next phase.

At a light emitting phase (the fourth time period), a high voltage level is applied to the third scan line Scan3, the fourth scan line Scan4 and the third light emitting control line Em3, and a low voltage level is applied to the second light emitting control line Em2 and the fourth light emitting control line Em4.

In the compensation unit, the eleventh switch transistor T11, the eighteenth switch transistor T18 and the nineteenth switch transistor T19 are turned on, and the first driving transistor DTFT1 and the second driving transistor DTFT2 drive the first display device OLED1 and the second display device OLED2 to emit light respectively.

Now, the current flowing through the first display device OLED1 can be obtained according to a formula for saturated current of a TFT as follows:

$$Ioled1 = K(VGS - Vth1)^2$$
$$= K[Vdd - (Vdd - Vth1 + V3) - Vth1]^2$$
$$= K \cdot (V3)^2$$

Likely, the current flowing through the second display device OLED2 is Ioled2=K·(V4)².

In the capacitive touch unit, the first capacitive transistor N1, the second capacitive transistor N2 and the third capacitive transistor N3 are all turned off to be in a halt state.

In the light sensitive type touch unit, now the amplified stored signal is transferred to an amplifier for reception at the end, and the amplified signal is for a processor to perform data calculation and analysis. If touch action occurs in this period, the difference between the optoelectronic signal intensities before and after the touch is compared with a no-touch threshold to determine whether there is touch (change of light illumination intensity) accordingly. Until now, the coordinate in the X direction is determined by the output point of the fourth light emitting control line Em4 at this time, and the coordinate in the Y direction is still determined by the Read Line. Now, the read line Read Line performs collection of touch signals for the second time.

It can be seen from the above formulas that the operation currents flowing through the two display devices are not influenced by the threshold voltages of their respective driving transistors, but are only related to the voltage Vdata input by the data line Data now, which completely avoids the drift problem of the threshold voltage (Vth) of the driving transistors due to process and long time operation, eliminates its influence on the driving current of the display device, and ensures normal operation of the display device. At the same time, it is also ensured to use one compensation unit to realize the driving of two pixel circuits. Reducing the number of the transistors in the compensation unit in such a way can reduce the sizes of the pixels dramatically and reduce IC cost, so as to obtain higher picture quality and higher PPI.

Fourth Embodiment

An embodiment of the present disclosure also provides a display apparatus comprising any of the above pixel structures. The display apparatus can be any product or component with display function, such as a liquid crystal display panel, electronic paper, an OLED panel, a cell phone, a tablet, a television, a display, a notebook computer, a digital photo frame, a navigator, and so on.

Since the display apparatus in the embodiment of the present disclosure comprises the above pixel structure, it can have high resolution.

It can be understood that the above embodiments are only exemplary implementations adopted to explain the principle of the present disclosure, but the present disclosure is not limited to that. Variations and improvements that can be made by those skilled in the art without departing from the spirit and essence of the present disclosure, and these variations and improvements should fall within the protection scope of the present disclosure.

The present application claims the priority of Chinese Patent Application No. 201410321351.2 filed on Jul. 7, 2014, entire content of which is incorporated as part of the present invention by reference.

What is claimed is:

1. A pixel structure comprising a plurality of pixel units, wherein the pixel structure further comprises compensation units corresponding to the pixel units, each of the pixel units comprises two adjacent pixel circuits which are a first pixel circuit and a second pixel circuit, the first pixel circuit comprises a first driving transistor and a first display device, the second pixel circuit comprises a second driving transistor and a second display device, and the first pixel circuit and the second pixel circuit share the compensation unit and are controlled by a same data line;

the compensation unit is configured to adjust a gate voltage of the first driving transistor in the first pixel circuit to eliminate the influence of the threshold voltage of the first driving transistor on the driving current of the first display device, and to adjust a gate voltage of the second driving transistor in the second pixel circuit to eliminate the influence of the threshold voltage of the second driving transistor on the driving current of the second display device;

wherein the compensation unit comprises a first switch transistor, a second switch transistor, a third switch transistor, a fourth switch transistor, a fifth switch transistor, a sixth switch transistor, a seventh switch transistor, an eighth switch transistor, a ninth switch transistor, a tenth switch transistor, a first storage capacitor, and a second storage capacitor;

a gate of the first switch transistor is connected to a gate of the second switch transistor, a gate of the seventh transistor, and a first light emitting control line, a source of the first switch transistor is connected to a source of the second switch transistor and a first reference voltage source, and a drain of the first switch transistor is connected to a source of the fourth switch transistor and a source of the first driving transistor;

the gate of the second switch transistor is connected to a gate of the eighth switch transistor, a drain of the second switch transistor is connected to a source of the fifth switch transistor and a source of the second driving transistor;

a gate of the third switch transistor is connected to a gate of the fourth switch transistor and a first scan line, a source of the third switch transistor is connected to a data line, a drain of the third switch transistor is connected to a second terminal of the first storage capacitor and a source of the seventh switch transistor;

a drain of the fourth switch transistor is connected to a first terminal of the first storage capacitor and a gate of the first driving transistor;

a gate of the fifth switch transistor is connected to a gate of the sixth switch transistor and a second scan line, a source and a drain of the fifth switch transistor are connected to a first terminal of the second storage capacitor and a gate of the second driving transistor;

a source of the sixth switch transistor is connected to the data line, a drain of the sixth switch transistor is connected to a second terminal of the second storage capacitor and a drain of the eighth switch transistor;

a drain of the seventh switch transistor is connected to a source of the ninth switch transistor, a drain of the first driving transistor, and a first terminal of the first display device, and a second terminal of the first display device is grounded;

a source of the eighth switch transistor is connected to a source of the tenth switch transistor, a drain of the second driving transistor, and a first terminal of the second display device, and a second terminal of the second display device is grounded;

a gate of the ninth switch transistor is connected to a gate of the tenth switch transistor and the second scan line, and a drain of the ninth switch transistor is grounded;

a drain of the tenth switch transistor is grounded.

2. The pixel structure according to claim 1, wherein the first switch transistor, the second switch transistor, the third switch transistor, the fourth switch transistor, the fifth switch transistor, the sixth switch transistor, the seventh switch transistor, the eighth switch transistor, the ninth switch transistor, the tenth switch transistor, the first driving transistor, the second driving transistor are all N type thin film transistors.

3. The pixel structure according to claim 1, wherein the compensation unit comprises an eleventh switch transistor, a twelfth switch transistor, a thirteenth switch transistor, a fourteenth switch transistor, a fifteenth switch transistor, a sixteenth switch transistor, a seventeenth switch transistor, an eighteenth switch transistor, a nineteenth switch transistor, a third storage capacitor, and a fourth storage capacitor;

a gate of the eleventh switch transistor is connected to a second light emitting control line, a source of the eleventh switch transistor is connected to the first reference voltage source, a drain of the eleventh switch transistor is connected to the source of the first driving transistor and the source of the second driving transistor;

a gate of the twelfth switch transistor is connected to a third scan line, a source of the twelfth switch transistor is connected to the data line, a drain of the twelfth switch transistor is connected to a source of the thirteenth switch transistor and a first terminal of the third storage capacitor;

a gate of the thirteenth switch transistor is connected to a gate of the fourteenth switch transistor and a third light emitting control line, and a drain of the thirteenth switch transistor is grounded;

a source of the fourteenth switch transistor is connected to a first terminal of the fourth storage capacitor and a drain of the fifteenth switch transistor, and a drain of the fourteenth switch transistor is grounded;

a gate of the fifteenth switch transistor is connected to a fourth scan line, and a source of the fifteenth switch transistor is connected to the data line;

a gate of the sixteenth switch transistor is connected to a gate of the seventeenth switch transistor and a third light emitting control line, a source of the sixteenth switch transistor is connected to the gate of the first driving transistor and a second terminal of the third storage capacitor, a drain of the sixteenth switch transistor is connected to the drain of the first driving transistor and a source of the eighteenth switch transistor;

a source of the seventeenth switch transistor is connected to the gate of the second driving transistor and a second terminal of the fourth storage capacitor, a drain of the seventeenth switch transistor is connected to the drain of the second driving transistor and a source of the nineteenth switch transistor;

a gate of the eighteenth switch transistor is connected to a gate of the nineteenth switch transistor and a fourth light emitting control line, a drain of the eighteenth switch transistor is connected to the first terminal of the first display device, and the second terminal of the first display device is grounded;

a drain of the nineteenth switch transistor is connected to the first terminal of the second display device, and the second terminal of the second display device is grounded.

4. The pixel structure according to claim 3, wherein the pixel structure further comprises a capacitive touch unit and a light sensitive type touch unit connected to the compensation unit;

the capacitive touch unit is configured to generate a corresponding electrical signal according to a touch signal and realize touch and control by a finger;

the light sensitive type touch unit is configured to generate a corresponding electrical signal according to an illumination intensity signal and realize touch and control by a laser pen.

5. The pixel structure according to claim 4, wherein the capacitive touch unit comprises a first capacitive transistor, a second capacitive transistor, a third capacitive transistor, a fifth storage capacitor and a touch electrode;

a gate of the first capacitive transistor is connected to the light sensitive type touch unit and the third light emitting control line, a source of the first capacitive transistor is connected to the data line, a drain of the first capacitive transistor is connected to a first terminal of the fifth storage capacitor and a gate of the second capacitive transistor;

a source of the second capacitive transistor is connected to a drain of the third capacitive transistor, a drain of the second capacitive transistor is connected to a second terminal of the fifth storage capacitor and a common electrode;

a gate of the third capacitive transistor is connected to the third scan line, a source of the third capacitive transistor is connected to a read line;

the touch electrode is connected to the gate of the second capacitive transistor.

6. The pixel structure according to claim 5, wherein the light sensitive type touch unit comprises a first light sensitive type transistor, a second light sensitive type transistor, a third light sensitive type transistor, a light sensitive transistor, and a sixth storage capacitor;

a gate of the light sensitive transistor is connected to a source of the first light sensitive type transistor, a source of the second light sensitive type transistor and a first terminal of the sixth storage capacitor, a drain of the light sensitive transistor is connected to a second terminal of the sixth storage capacitor and a source of the third light sensitive type transistor, and a source of the light sensitive transistor is connected to a source of the second light sensitive type transistor;

a gate of the first light sensitive type transistor is connected to the capacitive touch unit, and a drain of the first light sensitive type transistor is grounded;

a gate of the second light sensitive type transistor is connected to the fourth scan line, a drain of the second light sensitive type transistor is connected to the data line;

a gate of the third light sensitive type transistor is connected to the fourth light emitting control line, and a drain of the third light sensitive type transistor is connected to the read line.

7. The pixel structure according to claim 3, wherein the eleventh switch transistor, the twelfth switch transistor, the thirteenth switch transistor, the fourteenth switch transistor, the fifteenth switch transistor, the sixteenth switch transistor, the seventeenth switch transistor, the eighteenth switch transistor, the nineteenth switch transistor, the first driving transistor, the second driving transistor are all P type thin film transistors.

8. The pixel structure according to claim 5, wherein all the transistors are P type thin film transistors.

9. The pixel structure according to claim 6, wherein the light sensitive transistor is an N type thin film transistor, the other transistors are all P type thin film transistors.

10. A driving method of a pixel structure, wherein the pixel structure is a pixel structure according to claim 1, and the driving method comprising steps of:

at a threshold compensation phase, by the compensation unit, adjusting the gate voltage of the first driving transistor in the first pixel circuit to eliminate the influence of the threshold voltage of the first driving transistor on the driving current of the first display device and adjusting the gate voltage of the second driving transistor in the second pixel circuit to eliminate the influence of the threshold voltage of the second driving transistor on the driving current of the second display device.

11. A display apparatus comprising a pixel structure according to claim 1.

12. The pixel structure according to claim 4, wherein the eleventh switch transistor, the twelfth switch transistor, the thirteenth switch transistor, the fourteenth switch transistor, the fifteenth switch transistor, the sixteenth switch transistor, the seventeenth switch transistor, the eighteenth switch transistor, the nineteenth switch transistor, the first driving transistor, the second driving transistor are all P type thin film transistors.

13. The driving method of the pixel structure according to claim 10, wherein the first switch transistor, the second switch transistor, the third switch transistor, the fourth switch transistor, the fifth switch transistor, the sixth switch transistor, the seventh switch transistor, the eighth switch transistor, the ninth switch transistor, the tenth switch transistor, the first driving transistor, the second driving transistor are all N type thin film transistors.

14. The driving method of the pixel structure according to claim 10, wherein the compensation unit comprises an eleventh switch transistor, a twelfth switch transistor, a thirteenth switch transistor, a fourteenth switch transistor, a fifteenth switch transistor, a sixteenth switch transistor, a seventeenth switch transistor, an eighteenth switch transistor, a nineteenth switch transistor, a third storage capacitor, and a fourth storage capacitor;

a gate of the eleventh switch transistor is connected to a second light emitting control line, a source of the eleventh switch transistor is connected to the first reference voltage source, a drain of the eleventh switch transistor is connected to the source of the first driving transistor and the source of the second driving transistor;

a gate of the twelfth switch transistor is connected to a third scan line, a source of the twelfth switch transistor is connected to the data line, a drain of the twelfth switch transistor is connected to a source of the thirteenth switch transistor and a first terminal of the third storage capacitor;

a gate of the thirteenth switch transistor is connected to a gate of the fourteenth switch transistor and a third light emitting control line, and a drain of the thirteenth switch transistor is grounded;

a source of the fourteenth switch transistor is connected to a first terminal of the fourth storage capacitor and a drain of the fifteenth switch transistor, and a drain of the fourteenth switch transistor is grounded;

a gate of the fifteenth switch transistor is connected to a fourth scan line, and a source of the fifteenth switch transistor is connected to the data line;

a gate of the sixteenth switch transistor is connected to a gate of the seventeenth switch transistor and a third light emitting control line, a source of the sixteenth switch transistor is connected to the gate of the first driving transistor and a second terminal of the third storage capacitor, a drain of the sixteenth switch transistor is connected to the drain of the first driving transistor and a source of the eighteenth switch transistor;

a source of the seventeenth switch transistor is connected to the gate of the second driving transistor and a second terminal of the fourth storage capacitor, a drain of the seventeenth switch transistor is connected to the drain of the second driving transistor and a source of the nineteenth switch transistor;

a gate of the eighteenth switch transistor is connected to a gate of the nineteenth switch transistor and a fourth light emitting control line, a drain of the eighteenth switch transistor is connected to the first terminal of the first display device, and the second terminal of the first display device is grounded;

a drain of the nineteenth switch transistor is connected to the first terminal of the second display device, and the second terminal of the second display device is grounded.

15. The driving method of the pixel structure according to claim 14, wherein the pixel structure further comprises a capacitive touch unit and a light sensitive type touch unit connected to the compensation unit;

the capacitive touch unit is configured to generate a corresponding electrical signal according to a touch signal and realize touch and control by a finger;

the light sensitive type touch unit is configured to generate a corresponding electrical signal according to an illumination intensity signal and realize touch and control by a laser pen.

16. The driving method of the pixel structure according to claim 15, wherein the capacitive touch unit comprises a first capacitive transistor, a second capacitive transistor, a third capacitive transistor, a fifth storage capacitor and a touch electrode;

a gate of the first capacitive transistor is connected to the light sensitive type touch unit and the third light emitting control line, a source of the first capacitive transistor is connected to the data line, a drain of the first capacitive transistor is connected to a first terminal of the fifth storage capacitor and a gate of the second capacitive transistor;

a source of the second capacitive transistor is connected to a drain of the third capacitive transistor, a drain of the second capacitive transistor is connected to a second terminal of the fifth storage capacitor and a common electrode;

a gate of the third capacitive transistor is connected to the third scan line, a source of the third capacitive transistor is connected to a read line;

the touch electrode is connected to the gate of the second capacitive transistor.

17. The driving method of the pixel structure according to claim 16, wherein the light sensitive type touch unit comprises a first light sensitive type transistor, a second light sensitive type transistor, a third light sensitive type transistor, a light sensitive transistor, and a sixth storage capacitor;

a gate of the light sensitive transistor is connected to a source of the first light sensitive type transistor, a source of the second light sensitive type transistor and a first terminal of the sixth storage capacitor, a drain of the light sensitive transistor is connected to a second terminal of the sixth storage capacitor and a source of the third light sensitive type transistor, and a source of the light sensitive transistor is connected to a source of the second light sensitive type transistor;

a gate of the first light sensitive type transistor is connected to the capacitive touch unit, and a drain of the first light sensitive type transistor is grounded;

a gate of the second light sensitive type transistor is connected to the fourth scan line, a drain of the second light sensitive type transistor is connected to the data line;

a gate of the third light sensitive type transistor is connected to the fourth light emitting control line, and a drain of the third light sensitive type transistor is connected to the read line.

18. The driving method of the pixel structure according to claim 14, wherein the eleventh switch transistor, the twelfth switch transistor, the thirteenth switch transistor, the fourteenth switch transistor, the fifteenth switch transistor, the sixteenth switch transistor, the seventeenth switch transistor, the eighteenth switch transistor, the nineteenth switch transistor, the first driving transistor, the second driving transistor are all P type thin film transistors.

* * * * *